United States Patent [19]
Ralston et al.

[11] Patent Number: 6,062,520
[45] Date of Patent: May 16, 2000

[54] OPPOSING SLING OBJECT HOLDING DEVICE

[76] Inventors: Richard L. Ralston; Rhonda J. Ralston, both of 4975 W. Hillside Dr., Eugene, Oreg. 97405; Robert E. Ralston, 762 W. 25th, Eugene, Oreg. 97405; Aron P. Ralston, 2706 Martin Luther King Way #B, Berkeley, Calif. 94703; John Timothy Coslow, 85435 McBeth Rd., Eugene, Oreg. 97405

[21] Appl. No.: 08/996,618

[22] Filed: Dec. 23, 1997

Related U.S. Application Data

[60] Provisional application No. 60/033,424, Dec. 24, 1996.

[51] Int. Cl.[7] .................................................. A01G 9/02
[52] U.S. Cl. ........................... 248/318; 47/67; 248/323; 294/150
[58] Field of Search .................................. 248/317, 318, 248/323, 309.1; 47/67; 294/27.1, 150

[56] References Cited

U.S. PATENT DOCUMENTS

| | | | |
|---|---|---|---|
| 770,738 | 9/1904 | Chessman | 248/318 |
| 1,600,931 | 9/1926 | Chatham | 248/318 |
| 1,782,886 | 11/1930 | Axell | 47/67 X |
| 1,839,636 | 1/1932 | Baker | 294/27.1 |
| 2,090,979 | 8/1937 | Johansen | 294/27.1 |
| 3,861,734 | 1/1975 | Welch | 294/150 X |
| 4,022,507 | 5/1977 | Marino | 294/150 X |
| 4,057,210 | 11/1977 | Wellman | 248/318 |
| 4,520,979 | 6/1985 | McInnis | 248/323 |
| 4,529,240 | 7/1985 | Engel | 294/150 X |
| 5,255,947 | 10/1993 | Schwartz | 294/150 X |

*Primary Examiner*—Derek J. Berger
*Attorney, Agent, or Firm*—Steven J. Adamson

[57] ABSTRACT

Opposing sling object holding device that includes a first flexible strand and a second flexible strand that have at least a first and a second intersection with a loop defined therebetween. The overlapping portions of the strands and the first and second intersection are held in a relative relationship by holding members. The holding members are not fixedly mounted to the strands or are releasably fixedly mounted so that the size and location of the loop can be changed to accommodate different sized pots and different hanging arrangements. The components of the hanging device preferably withstand environmental degradation and have a multiplicity of arrangements.

13 Claims, 2 Drawing Sheets

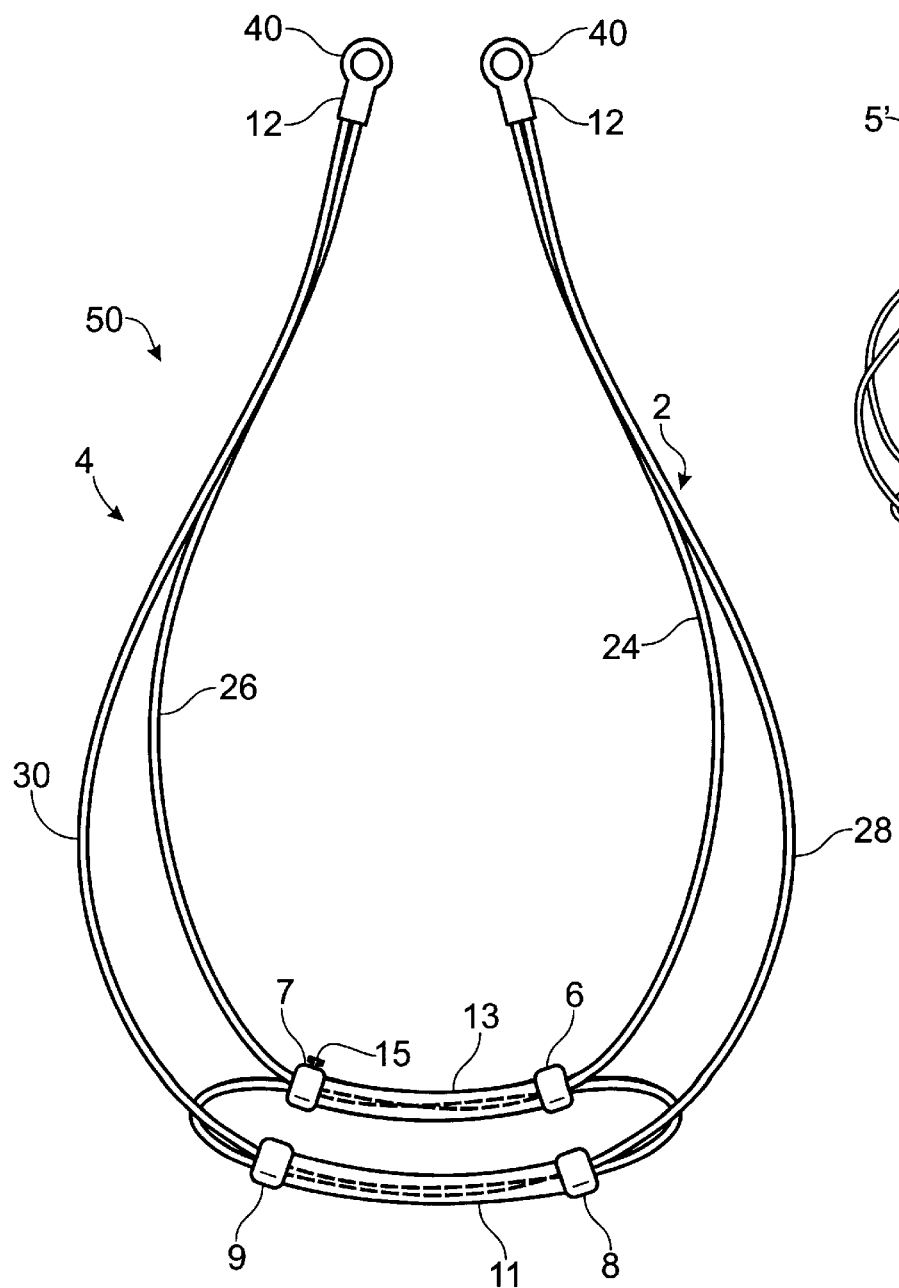
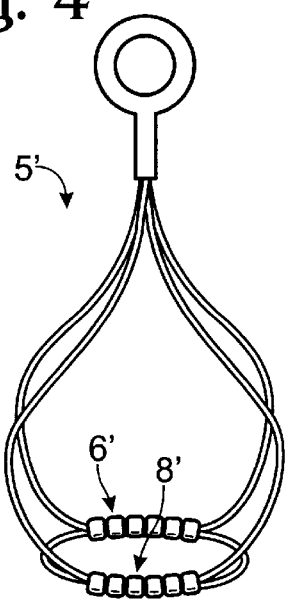

OPPOSING SLING OBJECT HOLDING DEVICE

RELATED APPLICATION

This application claims the benefit of U.S. Provisional Application No. 60/033,424, filed Dec. 24, 1996, and having the same title and inventors as above.

FIELD OF THE INVENTION

The present invention relates to devices for holding objects including potted plants, fish bowls, candles and the like and, more specifically, to such holding devices that utilize opposing slings.

BACKGROUND OF THE INVENTION

The prior art includes U.S. Pat. No. 1,600,931, issued to Chatham for a Sling Support for Vessels. The device of Chatham incorporates a pair or a plurality of pairs of opposing slings. Each sling in a pair includes two eyelets that are fixed therein and members of the opposite sling are positioned through these eyelets so as to generally form a circle for receiving a plant pot (see FIG. 3 of Chatham). Amongst other considerations, the arrangement of Chatham is disadvantageous in that the eyelets are fixedly connected to the slings. Fixed eyelets limit use of Chatham's device to a fairly narrow range of pot sizes and also limits the arrangement of hooks or the like from which the device is hung. Fixed eyelets also may be problematic in manufacture and operation, particularly when different materials are utilized to construct the slings. In addition, Chatham does not teach materials that are well suited to withstand environmental degradation.

OBJECTS OF THE INVENTION

Accordingly, it is an object of the present invention to provide an object holding device that utilizing opposing slings in which the position of members which hold the slings in proper arrangement are adjustable.

It is another object of the present invention to provide an opposing sling object holding device that is made of components that withstand environmental degradation.

It is another object of the present invention to provide an opposing sling object holding device that is readily manufacturable.

It is also an object of the present invention to provide an opposing sling object holding device that includes members for aligning overlapping portions of the opposing slings, the alignment members being characterized in that they promote low friction movement of the slings relative to one another and positive retention of an object in the holding device.

In one embodiment, the present invention includes a first flexible longitudinal member; a second flexible longitudinal member, said first and second longitudinal members being arranged to form at least a first and a second intersection with a loop defined therebetween; a first holding member provided at said first intersection that holds a portion of each of said first and second longitudinal members in a relative relationship at said first intersection; and a second holding member provided at said second intersection that holds a portion of each of said first and second longitudinal members in a relative relationship at said second intersection; wherein at least one of said first and second holding members is movable along said first and second longitudinal members, thereby permitting adjustment of the size or position of said loop. The other of said first and second holding members is also preferably movable along said first and second longitudinal members and the components of the object holding apparatus are preferably made of material that withstands environmental degradation. The holding members may have a plurality of configurations.

In another embodiment, the present invention includes a first flexible longitudinal member; a second flexible longitudinal member, said first and second longitudinal members being arranged to form at least a first and a second intersection with a loop defined therebetween; a first aligning member that aligns overlapping portions of said first and second longitudinal members at said first intersection; and a second aligning member that aligns overlapping portions of said first and second longitudinal members at said second intersection. At least one of said first and second aligning members is preferably flexible to conform towards the shape of an object being held by said apparatus and at least one of said first and second aligning members is preferably movable with respect to said first and second longitudinal members.

These and related objects of the present invention are achieved by use of the opposing sling object holding device described herein.

Attainment of the advantages and features of the invention should be more readily apparent to those skilled in the art, after review of the following more detailed description of the invention taken together with the drawings.

BRIEF DESCRIPTION OF THE DRAWINGS

FIG. 3 is a perspective view of another embodiment of an opposing sling object holding device in accordance with the present invention.

FIG. 4 is a perspective view of an opposing sling object holding device having a plurality of holding members at sling intersection regions in accordance with the present invention.

DETAILED DESCRIPTION

Figure 1A:
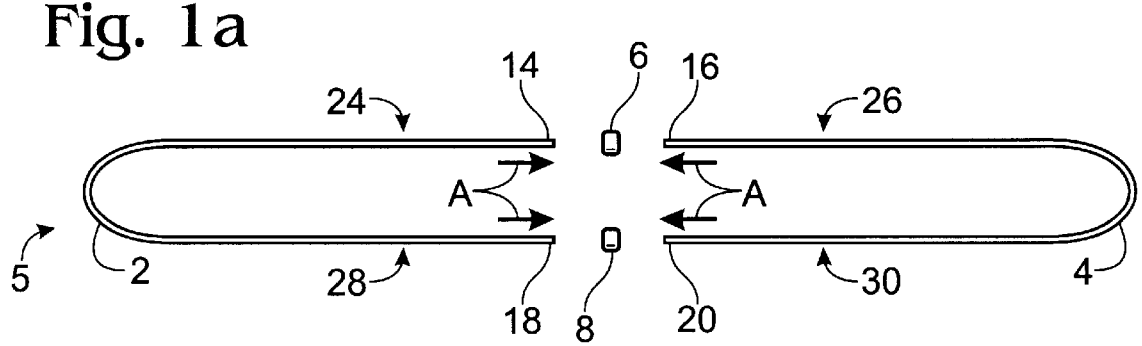
FIGS. 1A–1B are plan views of components of an opposing sling object holding device in accordance with the present invention.
Figure 1B:
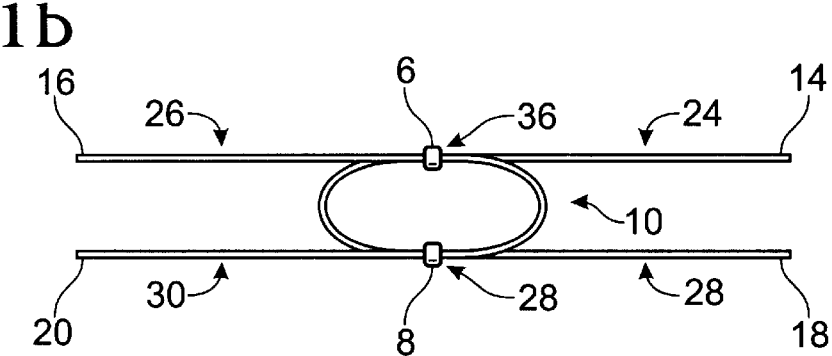

Referring to FIGS. 1A–1B, plan views of components of an opposing sling object holding device 5 in accordance with the present invention are shown. These components include two flexible strands or slings 2,4 of substantially equal length and at least two cored (for example, bead-like) members or like articles 6,8 for joining the slings. The ends 14,16,18,10 of the slings are inserted (in the direction of arrow A) through members 6,8 to form an adjustable size closed loop 10. A plant pot or other object to be held is placed within loop 10 and the opposing slings 2,4 are pulled tight against the pot or object. Slings 2,4 include half sections 24,28 and 26,30, respectively.

The slings 2,4 may be made of any material that is (1) sufficiently strong to support the weight of the pot or other object to be held, and (2) sufficiently flexible to form a close fitting loop around or under that object.

It is also desirable that the slings withstand environmental degradation. In a preferred embodiment, the slings are made of stainless steel aircraft cable (7×7 construction). This material withstands well environmental degradation. Other materials include fishing line, string, twine, rope, plastic, wire or the like. The cored members 6,8 (where "cored" means that they have a hole or channel or the like therethrough) are preferably made of plastic, metal or a similarly rigid and durable material. In a preferred embodiment, the cored members are nickel plated. Nickel plating and like finishes are inexpensive, withstand environmental degradation well and provide low friction contact with the slings.

To fabricate device 5, ends 14,16 of slings 2,4 are passed through the first cored member 6 in opposite directionS. Similarly, ends 18,20 of slings 2,4 are passed through the second cored member 8 in opposite directions. The result is adjustable size loop 10 with half lengths 24,26,28,30 extending from the loop.

Figure 2A:
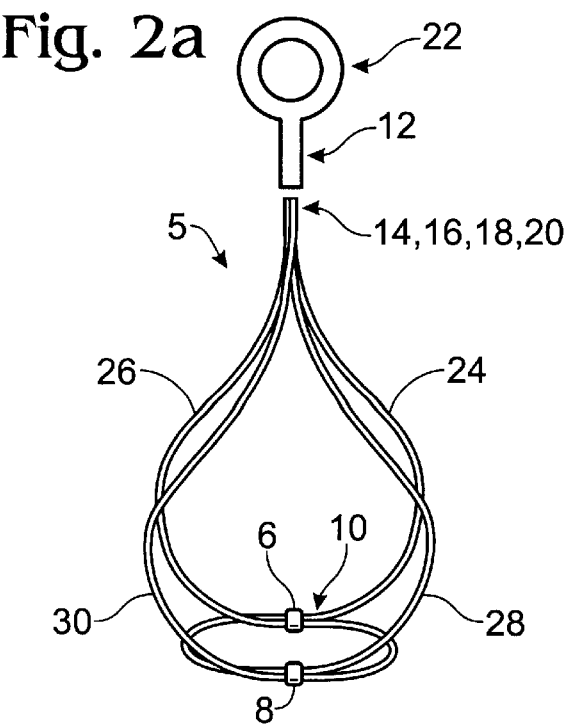
FIGS. 2A–2B perspective views of an object holding device made with the components of FIGS. 1A–1B in accordance with the present invention.
Figure 2B:
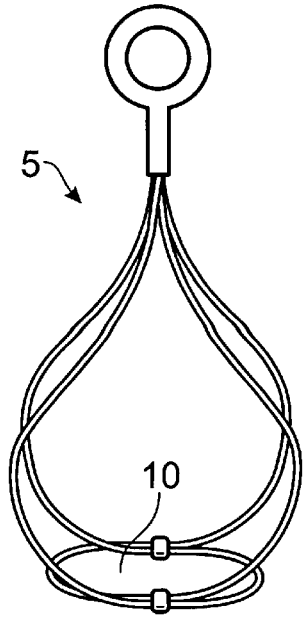

Referring to FIGS. 2A–2B, perspective views of the components of FIGS. 1A–1B assembled into an embodiment of opposing sling object holding device 5 in accordance with the present invention are shown. FIGS. 2A–2B illustrate member 12 for securing one, all or any combination of ends 14,16,18,20. Member 22 for suspending hanging device 5 is also shown. The four ends 14,16,18,20, or any subset thereof, are secured by knotting, gluing, clamping, crimping, soldering, welding or other means (which may depend on the composition of the sling material). The means or member 12 for securing the ends together may be incorporated into suspending member 22. The suspending member may comprise a knotted loop, hook, ring or other suitable arrangement.

The design of holding device 5 is such that the weight of an object being hung causes the adjustable loop to contract around the object. Holding device 5 is particularly well suited for holding objects with an outer rim or with a downward taper, but can also be used with object of other shapes, for example, by making the loop smaller than the bottom dimensions of the object and placing the object on top of the loop.

Referring to FIG. 3, another embodiment of an opposing sling object holding device 50 in accordance with the present invention is shown. This device 50 is similar to device 5 described above in that it include two opposing slings 2,4 having half lengths 24,26,28,30 and first and second cored members 6,8. Device 50 also includes first and second alignment and securing tubes 11,13 and third and fourth cored members 7,9. Tubes 11,13 align substantially parallel overlapping portions of slings 2,4 and also serve to secure a potted plant or other object placed in loop 10 by increasing frictional contact therewith. The tubes are preferably made of flexible polyurethane tubing having a wall thickness of at least 1/16" (though other thickness may be suitable) that is cut to a desired length from a spool. The tubes preferably include UV inhibitors to resist environmental degradation. The flexible nature of the tubes accommodates objects of differing dimensions because the tubes tend to conform to the shape of such objects. The provision of single tubes for each overlapping portion of slings 2,4 permits efficient assembly of device 50. This type of tubing is available commercially from Freelin-Wade Coil Hose Company of McMinnville, Oreg. This material provides a relatively low friction contact for movement of slings 2,4 therein while providing relatively high friction contact (compared to stainless steel slings) with a potted plant container or other object.

It should be recognized that other material may be used for tubes 11,13, including organic and inorganic materials. While the above characteristics (flexibility, environmental sturdiness, and friction considerations, etc.) are desirable, the present invention is not to be so limited. In addition, a multiplicity of cored members or the like can be substituted for tubes 11,13 (see FIG. 4 discussed below). Cored members 7,9 are preferably the same as cored members 6,8 described above. In addition, any of members 6–9 may include a screw such as screw 15 (the head of which is shown extending from member 7) threaded therethrough or other mechanisms to fixedly, yet releasably mounting the member to the slings. Absent such a releasable fixing mechanism, beads 6–9 are preferably not fixedly mounted to the slings.

In the embodiment of FIG. 3, the ends of each sling are preferably joined by joining mechanism 12 as shown. A loop 40 may be formed adjacent each joining mechanism for securing device 50 to a hook or the like.

Referring to FIG. 4, a perspective view of another embodiment of an opposing sling object holding device 5' in accordance with the present invention is shown. Device 5' is essentially the same as device 5 of FIGS. 1–2, however, device 5' includes a plurality of cored members or the like 6' at a first intersection of slings 2,4 and cored members or the like 8' at a second intersection of slings 2,4. Cored members 6' and 8' are analogous to cored members 6 and 8, respectively. The plurality of movable cored members may provide a desired spacing and increased support and pot retaining friction, in addition to possible aesthetic attributes.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

We claim:

1. Opposing sling object holding device, comprising:

a first flexible longitudinal sling member;

a second flexible longitudinal sling member, said first and second longitudinal sling members being arranged to form at least a first and a second intersection and thereby define a loop;

a first holding member provided at said first intersection that holds a portion of each of said first and second longitudinal members in a relative relationship at said first intersection;

a second holding member provided at said second intersection that holds a portion of each of said first and second longitudinal members in a relative relationship at said second intersection; and a plurality of additional holding members other than said first holding member provided at said first intersection, each of said additional holding members holding said first and second longitudinal members at said first intersection;

wherein each of said first and second sling members has a loop region and a distal region, said distal region of each sling member being provided on an opposite side of said holding members from said loop region, and each of said first and second sling members is formed of at least one substantially continuous material from said distal region through said loop region back to said distal region; and wherein at least one of said first and additional holding members and said second holding member is movable along said first and second longitudinal members, thereby permitting adjustment of the size or position of said loop.

2. The device of claim 1, wherein the other of said first and additional holding members and said second holding member is movable along said first and second longitudinal sling members.

3. The device of claim 1, wherein said first and second longitudinal sling members are made of a material that withstands environmental degradation.

4. The device of claim 1, wherein said first and second holding members have a surface that permits low friction movement along said first and second longitudinal sling members.

5. The device of claim 1, wherein said first and second holding members each include a physical mass having a hole defined therethrough through which the first and second longitudinal sling members pass.

6. The device of claim 1, wherein at least one of said holding members is capable of being releasably fixedly coupled to said first and second longitudinal sling members.

7. An opposing sling object holding device, comprising:
a first flexible longitudinal member;
a second flexible longitudinal member, said first and second longitudinal members being arranged to form at least a first and a second intersection with a loop defined therebetween;
a first holding member provided at said first intersection that holds a portion of each of said first and second longitudinal members in a relative relationship at said first intersection;
a second holding member provided at said second intersection that holds a portion of each of said first and second longitudinal members in a relative relationship at said second intersection;
a third holding member provided at said first intersection for holding a portion of each of said first and second longitudinal sling members at said first intersection; and
a spacer provided between said first and third holding members;
wherein each of said first and second sling members has a loop region and a distal region, said distal region of each sling member being provided on an opposite side of said holding members from said loop region, and each of said first and second sling members is formed of at least one substantially continuous material from said distal region through said loop region back to said distal region; and
wherein at least one of said first and third holding members and said second holding member is movable along said first and second longitudinal members, thereby permitting adjustment of the size or position of said loop.

8. The device of claim 7, wherein said spacer also provides alignment of said portions of said first and second longitudinal sling members at said first intersection.

9. The device of claim 7, wherein said spacer is flexible.

10. The device of claim 7, wherein at least one of said holding members is capable of being releasably fixedly coupled to said first and second longitudinal sling members.

11. The device of claim 7, wherein at the other of said first and third holding members and said second holding member is movable with respect to said first and second longitudinal members.

12. The device of claim 7, wherein each of said holding members is configured to define a longitudinally disposed channel through which overlapping portions of said first and second longitudinal members pass.

13. Opposing sling object holding device, comprising:
a first flexible longitudinal member;
a second flexible longitudinal member, said first and second longitudinal members being arranged to form at least a first and a second intersection with a loop defined therebetween;
a first aligning member that aligns overlapping portions of said first and second longitudinal members at said first intersection;
a second aligning member that aligns overlapping portions of said first and second longitudinal members at said second intersection; and
first and second longitudinal member holding members provided at said first intersection, wherein said first aligning member is provided between said first and second longitudinal member holding members.

* * * * *